US011810041B2

(12) United States Patent
Mandava et al.

(10) Patent No.: US 11,810,041 B2
(45) Date of Patent: Nov. 7, 2023

(54) SYSTEM, METHOD, AND COMPUTER PROGRAM PRODUCT FOR PREDICTING PERISHABLE PRODUCT TEMPERATURES AND QUALITY

(71) Applicant: Inteligistics, Inc., Pittsburgh, PA (US)

(72) Inventors: Panduranga Rao Mandava, Pittsburgh, PA (US); Eric John Muriungi Kithinji, Salinas, CA (US); Lawrence Mallia, Carmel, CA (US); Prasanna Jayaramaiah Gowda, Pittsburgh, PA (US)

(73) Assignee: Inteligistics, Inc., Pittsburgh, PA (US)

( * ) Notice: Subject to any disclaimer, the term of this patent is extended or adjusted under 35 U.S.C. 154(b) by 0 days.

(21) Appl. No.: 17/499,032

(22) Filed: Oct. 12, 2021

(65) Prior Publication Data

US 2022/0114528 A1 Apr. 14, 2022

Related U.S. Application Data

(60) Provisional application No. 63/090,895, filed on Oct. 13, 2020.

(51) Int. Cl.
*G06Q 50/04* (2012.01)
*G01K 3/14* (2006.01)
(Continued)

(52) U.S. Cl.
CPC ......... *G06Q 10/06395* (2013.01); *G01K 3/14* (2013.01); *G06F 11/3013* (2013.01);
(Continued)

(58) Field of Classification Search
CPC ....... G06Q 10/06395; G06Q 10/06375; G06Q 50/04; G01K 3/14; G06F 11/3013; G06F 11/3058
See application file for complete search history.

(56) References Cited

U.S. PATENT DOCUMENTS 6,536,189 B1 * 3/2003 Murray ................. B65B 25/001
53/472
7,905,100 B2 * 3/2011 Thybo ................... F25D 21/006
62/157
(Continued)

FOREIGN PATENT DOCUMENTS

CN 111811181 A * 10/2020

OTHER PUBLICATIONS

Tsang et al. "An intelligent model for assuring food quality in managing a multi-temperature food distribution centre" (2018) (https://www.sciencedirect.com/science/article/pii/S0956713518300768) (Year: 2018).*

*Primary Examiner* — Sujay Koneru
(74) *Attorney, Agent, or Firm* — THE WEBB LAW FIRM

(57) ABSTRACT

Provided is a system, method, and computer program product for predicting product temperatures. The system includes at least one processor programmed or configured to collect, from temperature probes, temperature data of the plurality of different perishable products during a time period, collect, from at least one environmental sensor, environmental data of the at least one environment during the time period, generate a machine-learning model based on the temperature data and the environmental data, collect second environmental data from the at least one environmental sensor and/or from a separate data source while at least one package of at least one perishable product is in the at least one environment, and generate a predicted temperature of the at least one perishable product based on inputting the second environmental data into the machine-learning model.

19 Claims, 6 Drawing Sheets

(51) Int. Cl.
*G06F 11/30* (2006.01)
*G06Q 10/0639* (2023.01)
*G06Q 10/0637* (2023.01)

(52) U.S. Cl.
CPC ... *G06F 11/3058* (2013.01); *G06Q 10/06375* (2013.01); *G06Q 50/04* (2013.01)

(56) References Cited

U.S. PATENT DOCUMENTS

| | | | | |
|---|---|---|---|---|
| 10,309,945 | B2* | 6/2019 | Mandava | G01K 1/024 |
| 10,877,013 | B2 | 12/2020 | Mandava et al. | |
| 11,488,106 | B1* | 11/2022 | Shoup | G06Q 10/087 |
| 2010/0034935 | A1* | 2/2010 | Wally | A47J 37/00 |
| | | | | 426/232 |
| 2012/0139470 | A1* | 6/2012 | Huff | F25D 11/003 |
| | | | | 318/739 |
| 2013/0289927 | A1* | 10/2013 | Smith | G06Q 10/0832 |
| | | | | 702/181 |
| 2014/0207501 | A1* | 7/2014 | Albee | G06Q 10/063 |
| | | | | 705/7.11 |
| 2014/0220193 | A1* | 8/2014 | Hocker | G01K 13/12 |
| | | | | 374/141 |
| 2014/0222522 | A1* | 8/2014 | Chait | G06Q 10/0637 |
| | | | | 705/7.36 |
| 2015/0010679 | A1* | 1/2015 | Strong | A23L 3/06 |
| | | | | 99/468 |
| 2015/0300887 | A1* | 10/2015 | Mandava | G01N 33/02 |
| | | | | 702/130 |
| 2016/0012337 | A1* | 1/2016 | Kaye | G06N 5/04 |
| | | | | 706/46 |
| 2016/0166470 | A1* | 6/2016 | Tobescu | A61J 1/18 |
| | | | | 29/407.09 |
| 2017/0082335 | A1* | 3/2017 | Jin | B60H 1/3232 |
| 2017/0224161 | A1* | 8/2017 | Li | F24C 7/085 |
| 2017/0255901 | A1* | 9/2017 | Bermudez Rodriguez | |
| | | | | G06F 16/2455 |
| 2018/0088098 | A1* | 3/2018 | Mandava | G01K 1/022 |
| 2019/0164124 | A1* | 5/2019 | Beasley | G06Q 10/0838 |
| 2019/0167014 | A1* | 6/2019 | Seiss | A47F 3/0478 |
| 2019/0182329 | A1* | 6/2019 | Moss | G06N 20/00 |
| 2019/0212048 | A1* | 7/2019 | Garner | F25D 31/007 |
| 2019/0315553 | A1* | 10/2019 | Fiflis | B65D 81/18 |
| 2019/0370817 | A1* | 12/2019 | Uysal | G06Q 30/018 |
| 2020/0184153 | A1* | 6/2020 | Bongartz | A01G 9/249 |
| 2021/0025611 | A1* | 1/2021 | Turner | F24F 11/38 |
| 2022/0011045 | A1* | 1/2022 | Hirsch | F25D 29/006 |

* cited by examiner

SYSTEM, METHOD, AND COMPUTER PROGRAM PRODUCT FOR PREDICTING PERISHABLE PRODUCT TEMPERATURES AND QUALITY

CROSS-REFERENCE TO RELATED APPLICATION

This application claims priority to U.S. Provisional Patent Application No. 63/090,895, filed Oct. 13, 2020, the disclosure of which is hereby incorporated by reference in its entirety.

BACKGROUND

1. Field

This disclosure relates generally to monitoring the temperature and other conditions important to the quality of perishable goods and, in non-limiting embodiments, to systems, methods, and computer-program products for predicting product temperatures and other conditions such as humidity, vibration, light, gases (e.g., such as $CO_2$, $O_2$ and Ethylene) that have an effect on product quality.

2. Technical Considerations

Existing systems and methods for monitoring the temperature of perishable goods, such as produce, include physical temperature sensors that are inserted into the produce for real-time monitoring. Based on these readings, the temperature can be obtained while the product is in harvesting, manufacturing, processing, cooling, storage, in transit, and/or the like.

SUMMARY

According to non-limiting embodiments or aspects, provided is a method for predicting product temperatures, comprising: inserting temperature probes into a plurality of different perishable products being stored and/or transported in at least one environment; arranging, in the at least one environment, at least one environmental sensor, the at least one environmental sensor is not affixed to the plurality of different perishable products; collecting, from the temperature probes, temperature data of the plurality of different perishable products during a time period; collecting, from the at least one environmental sensor, environmental data of the at least one environment during the time period; generating a machine-learning model based on the temperature data and the environmental data, the machine-learning model comprising associations between different product types and temperature changes over time in the at least one environment; arranging at least one package of at least one perishable product in the at least one environment, the at least one perishable product is not part of the plurality of different perishable products; collecting second environmental data from the at least one environmental sensor and/or from a separate data source while the at least one package is in the at least one environment; and generating a predicted temperature of the at least one perishable product based on inputting the second environmental data into the machine-learning model.

In non-limiting embodiments or aspects, the predicted temperature is generated based partially on a product type of the at least one perishable product. In non-limiting embodiments or aspects, the predicted temperature is generated based partially on a package type of the at least one package. In non-limiting embodiments or aspects, the predicted temperature is generated based partially on a room configuration of the at least one environment. In non-limiting embodiments or aspects, the at least one environment comprises at least one of the following: a forced air chamber, a vacuum tube, a vehicle cargo unit, or any combination thereof. In non-limiting embodiments or aspects, the predicted temperature comprises at least one of the following: a current predicted temperature, a temperature at a future time in the at least one environment, a temperature at a future time in at least one other environment, or any combination thereof. In non-limiting embodiments or aspects, the at least one environmental sensor comprises at least one of the following: a temperature sensor configured to measure a temperature in the at least one environment, a pressure sensor configured to measure pressure in the at least one environment, a vacuum tube sensor configured to measure at least one parameter of a vacuum tube, a gas sensor configured to measure at least one parameter of gas applied to the product, or any combination thereof.

According to non-limiting embodiments or aspects, provided is a system for predicting product temperatures, comprising at least one processor programmed or configured to: collect, from temperature probes inserted into a plurality of different perishable products being stored and/or transported in at least one environment, temperature data of the plurality of different perishable products during a time period; collect, from at least one environmental sensor arranged in the at least one environment, environmental data of the at least one environment during the time period, the at least one environmental sensor is not affixed to the different perishable products; generate a machine-learning model based on the temperature data and the environmental data, the machine-learning model comprising associations between different product types and temperature changes over time in the at least one environment; collect second environmental data from the at least one environmental sensor and/or from a separate data source while at least one package of at least one perishable product is in the at least one environment, the at least one perishable product is not part of the plurality of different perishable products; and generate a predicted temperature of the at least one perishable product based on inputting the second environmental data into the machine-learning model.

In non-limiting embodiments or aspects, the predicted temperature is generated based partially on a product type of the at least one perishable product. In non-limiting embodiments or aspects, the predicted temperature is generated based partially on a package type of the at least one package. In non-limiting embodiments or aspects, the predicted temperature is generated based partially on a room configuration of the at least one environment. In non-limiting embodiments or aspects, the at least one environment comprises at least one of the following: a forced air chamber, a vacuum tube, a vehicle cargo unit, or any combination thereof. In non-limiting embodiments or aspects, the predicted temperature comprises at least one of the following: a current predicted temperature, a temperature at a future time in the at least one environment, a temperature at a future time in at least one other environment, or any combination thereof. In non-limiting embodiments or aspects, the at least one environmental sensor comprises at least one of the following: a temperature sensor configured to measure a temperature in the at least one environment, a pressure sensor configured to measure pressure in the at least one environment, a vacuum tube sensor configured to measure at least one parameter of a vacuum tube, or any combination thereof. In non-limiting embodiments or aspects, the at least one processor is further configured to generate at least one of the following: an optimal cooling time based on the predicted temperature, a resulting product temperature in different locations in the environment based on a range of ambient temperatures, or any combination thereof. In non-limiting embodiments or aspects, the separate data source comprises a database having environmental configuration data stored therein. In non-limiting embodiments or aspects, the at least one processor is further programmed or configured to generate at least one of the following: an optimal cooling time based on the predicted temperature, a resulting product temperature in different locations in the environment based on a range of ambient temperatures, or any combination thereof. In non-limiting embodiments or aspects, the separate data source comprises a database having environmental configuration data stored therein.

According to non-limiting embodiments or aspects, provided is a computer program product for predicting product temperatures, comprising at least one non-transitory computer readable medium including program instructions that, when executed by at least one processor, cause the at least one processor to: collect, from temperature probes inserted into a plurality of different perishable products being stored and/or transported in at least one environment, temperature data of the plurality of different perishable products during a time period; collect, from at least one environmental sensor arranged in the at least one environment, environmental data of the at least one environment during the time period, the at least one environmental sensor is not affixed to the different perishable products; generate a machine-learning model based on the temperature data and the environmental data, the machine-learning model comprising associations between different product types and temperature changes over time in the at least one environment; collect second environmental data from the at least one environmental sensor and/or from a separate data source while at least one package of at least one perishable product is in the at least one environment, the at least one perishable product is not part of the plurality of different perishable products; and generate a predicted temperature of the at least one perishable product based on inputting the second environmental data into the machine-learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include a GPU. In non-limiting embodiments, a computing device may be comprised of a plurality of circuits.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

Figure 1:
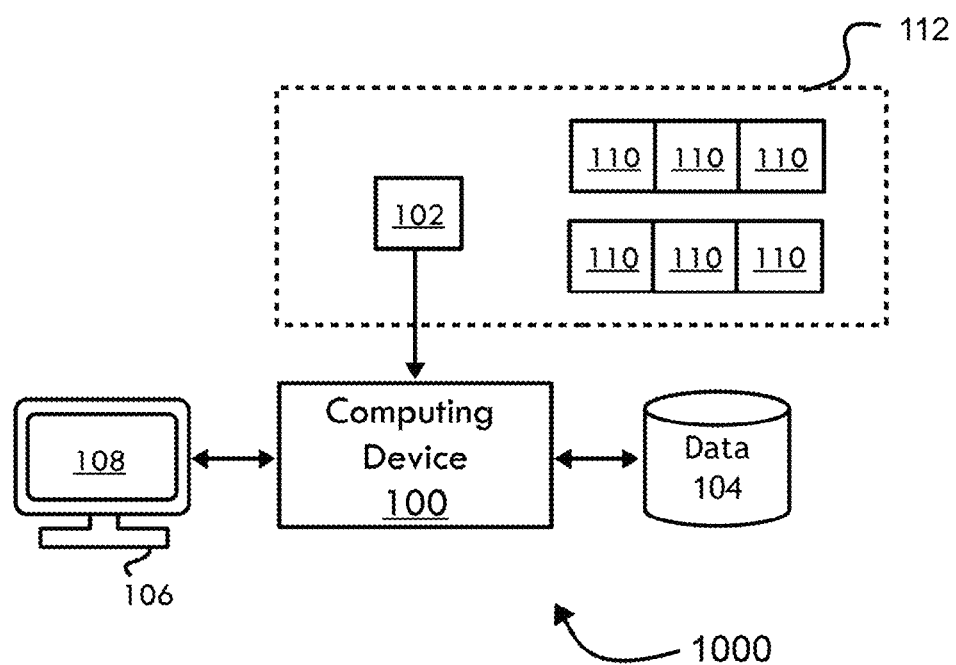
FIG. 1 illustrates a system for predicting product temperatures according to non-limiting embodiments or aspects.

Referring now to FIG. 1, a system 1000 for predicting product temperatures is shown according to non-limiting embodiments. A computing device 100 is in communication with one or more environmental sensors 102 arranged in an environment 112, such as a chamber, vacuum tube, vehicle cargo unit (e.g., truck, container, and/or the like), storage unit, and/or the like. The environmental sensor(s) 102 may include one or more temperature sensors, pressure sensors, vacuum tube sensors (e.g., sensors that are part of the vacuum tube mechanism and/or control system that provide vacuum tube parameters), humidity sensors, gas sensors, vibration sensors, light sensors, and/or the like. Although the system 1000 is described as predicting product temperatures, the system 1000 may also predict other values based on predicted product temperatures, such as the time period for a product (e.g., a pallet of perishable products) to be in a location or environment (e.g., an optimal cooling time), the time period for the product to be moved to a different location or environment, and/or the like.

With continued reference to FIG. 1, the environment 112 includes a plurality of products, such as pallets 110 of products, to be monitored. The products may include perishable goods such as food, flowers, pharmaceuticals, healthcare products, and environmentally sensitive industrial products, as examples. In some non-limiting embodiments, the system 1000 may also be used with non-perishable but environmentally-sensitive high-value items (e.g., electronic devices). The products may be monitored with physical sensor devices, such as those described in U.S. Pat. No. 10,309,945 to Mandava, entitled "System, method, and apparatus for temperature monitoring and visibility," and U.S. Pat. No. 10,877,013 to Mandava, entitled "System, Method, and Apparatus for Condition Monitoring of Food and Other Perishable Products As Well As Environmentally Sensitive Industrial Supply Chains," both of which are hereby incorporated by reference in their entirety.

Still referring to FIG. 1, the computing device 100 is in communication with a database 104 storing monitoring data for the products that are monitored with physical sensor devices. For example, the database 104 may store records that list a product type, an environment type, an environment size/configuration, a storage time, an enter/exit time, a package type, a product quantity, a product temperature, a product humidity, an ambient temperature of the environment, a pressure of the environment, a humidity of the environment, and/or the like. The computing device 100 then develops and trains a machine-learning model based on the monitoring data, such as a neural network, a gradient boosted tree, and/or any other type of predictive model capable of inputting an ambient temperature or other environmental input data and outputting a predicted product temperature.

With continued reference to FIG. 1, the computing device 100 receives environmental data from the one or more environmental sensors 102 arranged in the environment 112 and inputs it into a machine-learning model. Another computing device 106 may be in communication with the computing device 100 to receive input from one or more users through a graphical user interface (GUI) 108. For example, a user may input product information, such as a product type, a product quantity, a package type, a package size, a storage time, a storage history, an environment type, an environment size/configuration, and/or the like. Such product information may alternatively or additionally be received from another data source, such as data linked to an identifier (e.g., a barcode or the like) on the products 110, data that was previously input, data that was input by other users, and/or the like. This product data may also be input into the machine-learning model by the computing device 100.

Once the machine-learning model outputs a predicted product temperature, the computing device 100 may communicate the prediction to the computing device 106 to be displayed on the GUI 108. The predicted product temperature may be a prediction of a current temperature of a product 110 and/or a prediction of a future temperature of a product 110. The prediction may be sent as an alert to be displayed on the GUI 108 (e.g., an alert that the predicted temperature is less than or greater than a desired predetermined temperature threshold), a notification that the products 110 may be ready to move, and/or the like. The predicted product temperatures may also be used to generate one or more GUIs 108 including visual representations of the products 110 in one or more environments 112, such as but not limited to the GUIs shown and described in U.S. Pat. No. 10,309,945 to Mandava, entitled "System, method, and apparatus for temperature monitoring and visibility".

Figure 2:
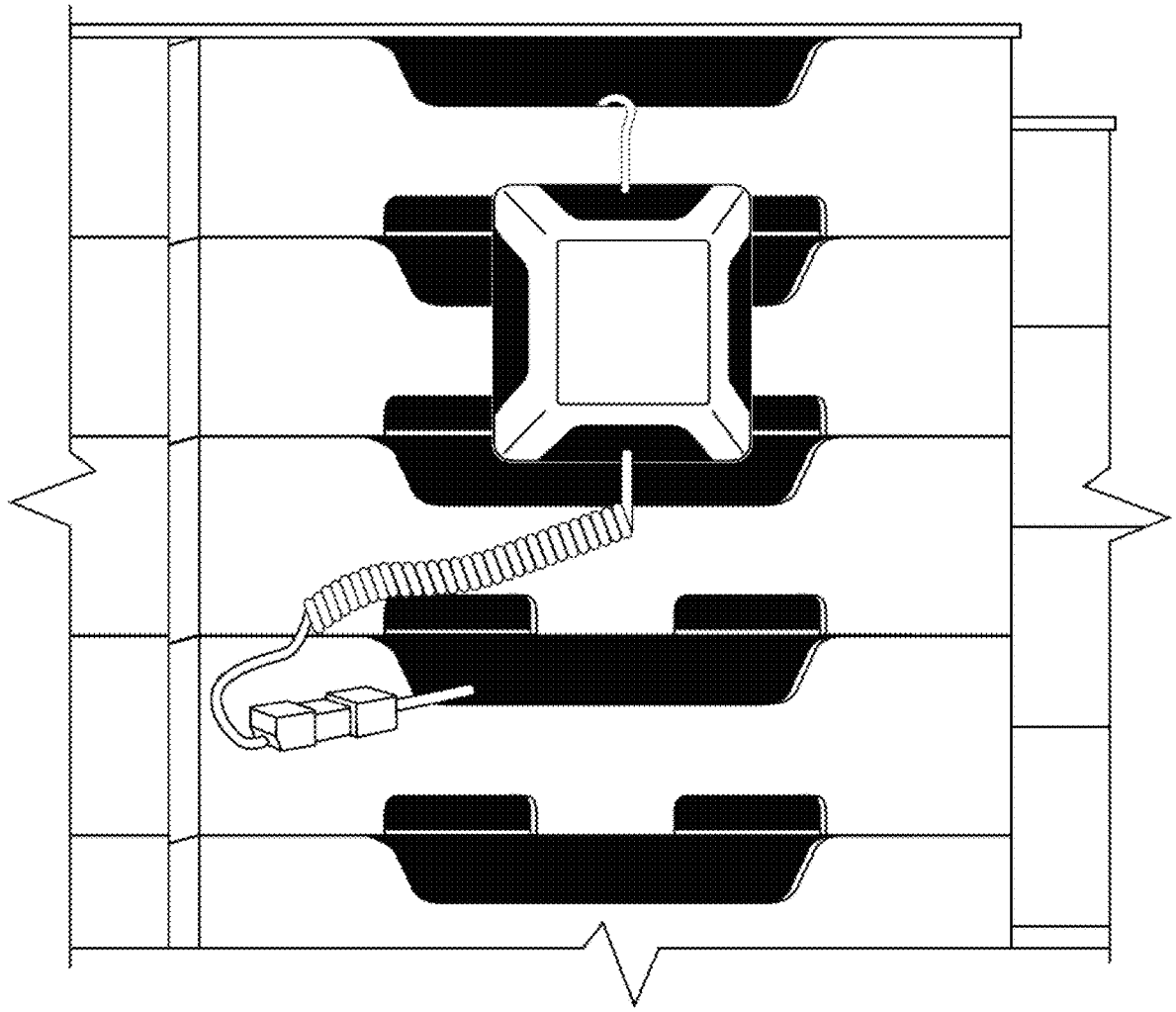
FIG. 2 illustrates perishable food products being measured with probes to collect data to train a machine-learning model according to non-limiting embodiments or aspects.

FIG. 2 shows pallets of food products having a physical temperature sensor probe inserted into a food product. This arrangement is further shown and described in U.S. Pat. No. 10,309,945 to Mandava, entitled "System, method, and apparatus for temperature monitoring and visibility", and is used to collect actual product temperature data for building and training the machine-learning model discussed herein.

Figure 3:
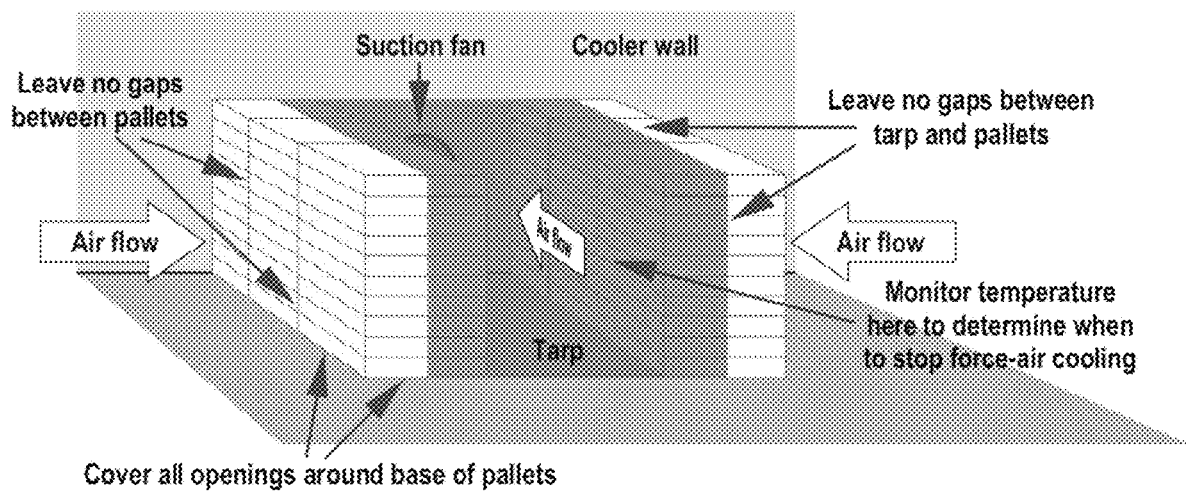
FIG. 3 illustrates an environment for a system for predicting product temperatures according to non-limiting embodiments or aspects.

FIG. 3 illustrates an environment of a forced air tunnel used for pre-cooling one or more products. An environmental sensor may be placed at or near the suction fan, within the tunnel between pallets, at a location to measure ambient air flowing through the product, and/or elsewhere in the environment.

In non-limiting embodiments, sensor data may be collected at predetermined intervals (e.g., every minute, every five minutes, every ten minutes, and/or the like) and may be associated with timestamps for each reading.

Figure 4:
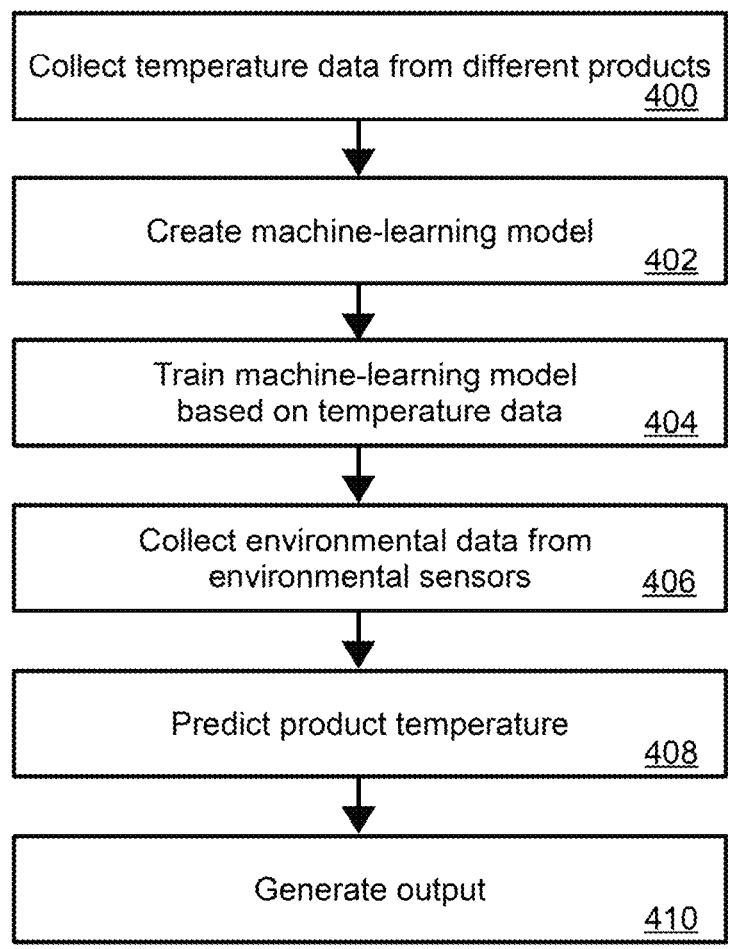
FIG. 4 illustrates a flow chart for a method for predicting product temperatures according to non-limiting embodiments or aspects.

Referring now to FIG. 4, shown is a flow diagram for a method for predicting the temperature of products according to a non-limiting embodiment. It will be appreciated that the order of the steps shown in FIG. 4 is for illustration purposes only and that non-limiting embodiments may involve more steps, fewer steps, different steps, and/or a different order of steps. At step 400, temperature data is collected from a plurality of different products. The temperature data may be actual temperature data measured with one or more temperature probes inserted into the products and/or packaging. The temperature data may be associated with monitoring data for each product and/or package of products monitored, including a product type, an environment type, an environment size/configuration, a storage time, an enter/exit time, a package type, a product quantity, a product temperature, a product humidity, an ambient temperature of the environment, a pressure of the environment, a humidity of the environment, and/or the like.

In non-limiting embodiments, the temperature data and associated timestamp data may be cleaned and/or normalized using pre-determined filters based on valid cycle data. For example, null values and values determined to be out-of-range may be ignored. In-range values may include, in non-limiting examples, a pre-cool time before swap exceeding 20 minutes, a total cycle time less than 180 minutes, an end temperature value greater than 32° F. and less than 35° F., a swap temperature value greater than 32°

F. and less than 35° F., a total swap time less than 21 minutes and greater than 0 minutes, a start value greater than 45° F., and/or the like. It will be appreciated that variations are possible and that different thresholds and filters may be used.

At step 402, a machine-learning model is created (e.g., generated) based on the temperature data and associated monitoring data. At step 404, the machine-learning model is trained based on the temperature data and monitoring data. The machine-learning model may be trained to predict the cycle start to swap time (e.g., an initial predicted time period) and, based on that initial prediction, to predict the cycle start to move time (e.g., a second predicted time period). It will be appreciated that various machine-learning architectures may be used. For example, a boosted decision tree regression model may be used to pass data through decision forest regression models which create paths in a model based on observations of cycle data (e.g., temperature and monitoring data) to determine the length of cooling, a current temperature, a future temperature, and/or the like. The inputs to the machine-learning model may include, for example, facility or cargo unit location, tunnel identifier, fan and ambient sensor identifiers, fan and ambient temperature values at cycle start, a predetermined number (e.g., ten) of ambient sensor readings before a cycle start, a predetermined number (e.g., ten) of ambient sensor readings after a cycle start, a difference between ambient and fan sensor readings after a cycle start, a cycle start to swap time (e.g., which may be used as an input to predict the cycle start to move time), and/or the like.

Products are received and stored in an environment where physical sensors may not be placed on the products. For example, pallets of perishable goods may be arranged in an environment without physical sensors monitoring the temperature. At step 406, environmental data is collected from one or more environmental sensors arranged in the environment. For example, ambient temperature data may be collected from ambient temperature sensors located within the environment. Collected environmental data may also include pressure data, humidity data, vacuum tube data, forced air tunnel data, local weather conditions data, refrigeration air flow data in a truck trailer or container, data about the environment (e.g., an environment type, an environment size/configuration, whether the environment is open or closed, etc.), and/or the like. The environmental data may additionally or alternatively be collected from one or more other non-sensor data sources. For example, environmental data may include environment configuration data (e.g., a specific design or arrangement for a truck, container, room, and/or the like) stored on one or more data storage devices.

At step 408, a product temperature is predicted based on inputting the collected environmental data and product information, such as a product type, a product quantity, a package type, a package size, a storage time, a storage history, and/or the like, into the machine-learning model. The product temperature may include or be used to calculate a current predicted temperature, a future predicted temperature (e.g., a temperature that will be reached within a period of time), a predicted remaining life/expiration for a product at any given point in time, an optimal cooling time, and/or the like.

At step 410, an output is generated based on the predicted temperature. For example, the output may be a predicted time at which the product will reach a desired temperature and be ready for moving, storage in another location, and/or the like. Such a predicted time may be generated based on a predicted current temperature and a known and/or predicted time period for changing temperatures within a particular environment. The output may also include, for example, one or more alerts, notifications, GUIs, a predicted remaining life/expiration for a product at any given point in time, and/or the like. In some non-limiting embodiments, the output may include an end-to-end prediction of temperature over a supply chain (e.g., from harvest to store for food products) or a particular part of a supply chain (e.g., transportation in a truck or a multi-modal transport from a first location to a second location).

In non-limiting embodiments, the predicted temperature may be used to predict product quality, product condition, product inventory, and/or other product parameters at a current time or at a specified time in the future. For example, this may include predicting product availability based on demand (e.g., scheduled orders) and supply (e.g., products received from suppliers).

In some non-limiting embodiments, the system may not predict a product temperature and may instead predict product quality, product condition, product inventory, and/or other product parameters at a current time or at a specified time in the future based on other environmental data, such as the presence of gas, light, vibration, humidity, and/or the like. These environmental conditions may be learned over time and used to train the machine-learning model such that the quality or condition of a product (e.g., whether it is expired or available for sale/consumption), or other product parameters, can be predicted based on non-sensor data.

Figure 5:
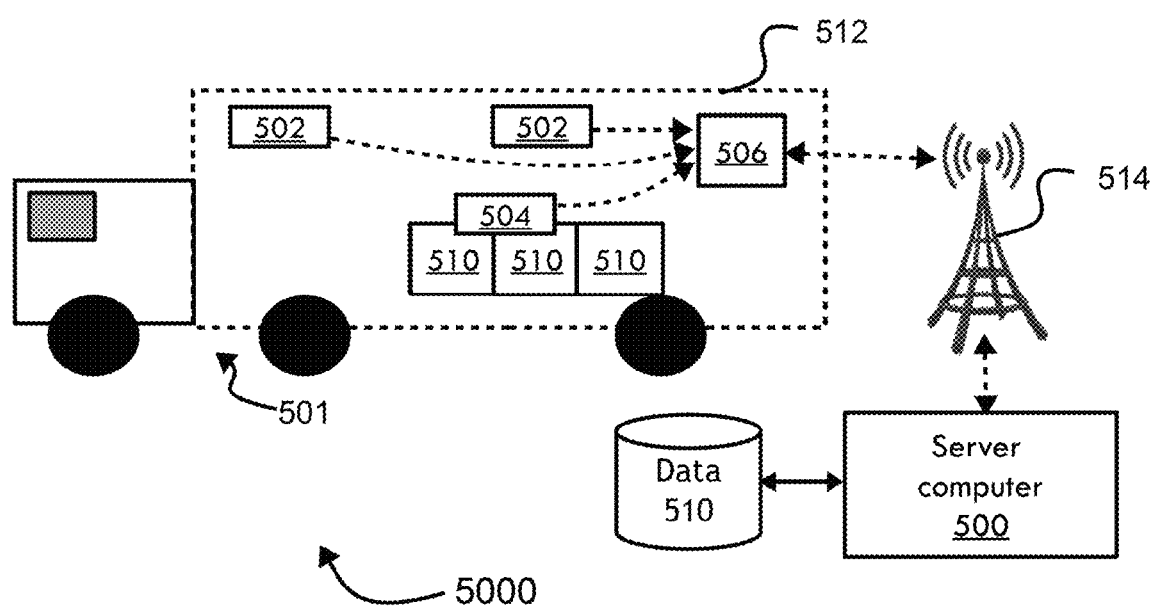
FIG. 5 illustrates a system for predicting product temperatures within a truck or other vehicle cargo space according to non-limiting embodiments or aspects.

Referring now to FIG. 5, a system 5000 for predicting product temperatures is shown according to non-limiting embodiments. In this example, an environment 512 is a cargo space of a truck. The cargo space environment 512 includes environmental sensors 502 which may be arranged in various locations in the environment 512. In some examples, the environment sensors may be fixed within at different locations within the environment such that the combination of readings from the sensors 502 represents, on average, the general environmental parameters. In other non-limiting examples, different environmental sensors 502 may be associated with one or more different containers 510 (e.g., pallets or the like) and/or temperature sensors 504 to provide more localized data.

With continued reference to FIG. 5, a communication gateway 506 is located in or near the environment 512. The communication gateway 506 may include a computing device configured to receive sensor data from the environmental sensors 502 and temperature sensors 504 via, for example, Bluetooth® or other wireless communication protocols. The communication gateway 506 may communicate the collected data to a server computer 500 via, for example, a wireless network 514 (e.g., a cellular network, a satellite network, a mobile internet network, and/or the like). In some examples, the sensors 502, 504 may include internal communication gateways that communicate with the server computer 500. The sensor data may include an identification of the truck (e.g., a truck identifier) or other cargo unit, a location of a pallet in the cargo space associated with particular temperature data (e.g., from individual temperature sensors associated with individual pallets), a location of the truck or other cargo unit (e.g., via GPS and/or the like), and individual sensor readings from each of the sensors.

In non-limiting embodiments, the communication gateway 506 may be a physical sensor device (such as those described in U.S. Pat. No. 10,309,945 to Mandava, entitled "System, method, and apparatus for temperature monitoring and visibility" and U.S. Pat. No. 10,877,013 to Mandava, entitled "System, Method, and Apparatus for Condition Monitoring of Food and Other Perishable Products As Well As Environmentally Sensitive Industrial Supply Chains") that include the temperature sensors 504. As explained above, the temperature sensors 504 may include temperature probes that are inserted into a perishable item to measure product temperature and/or product humidity. In non-limiting embodiments, the environmental sensors 502 may be in communication with the physical sensor device that also serves as the communication gateway 506, such that the communication gateway 506 receives wireless signals from the environmental sensors 502 and communicates that environmental sensor data with or separately from the sensor data from the physical sensor device (e.g., product sensor data, such as product temperature, product humidity, and/or the like).

In non-limiting embodiments, the communication gateway 506 may be part of a physical sensor device for measuring environmental data (e.g., environmental sensor data such as ambient temperature, humidity, vibration, gas, light, and/or the like) that is in communication with separate temperature probes (e.g., individual pump temperature sensors that are associated with pallets).

Still referring to FIG. 5, the cargo space environment 512 of a truck may likewise be a cargo space of an airplane, train car, and/or the like. In some examples, the cargo space environment 512 may include environmental controls, such as fans, exhausts, air intakes, heating and/or cooling units, and/or the like, to regulate the temperature, humidity, and/or air flow within the environment 512. In such examples, the arrangement of the environmental sensors 502 within the cargo space environment 512 may be based on the location of the air intake, air exhaust, cooling unit, and/or the like.

Figure 6:
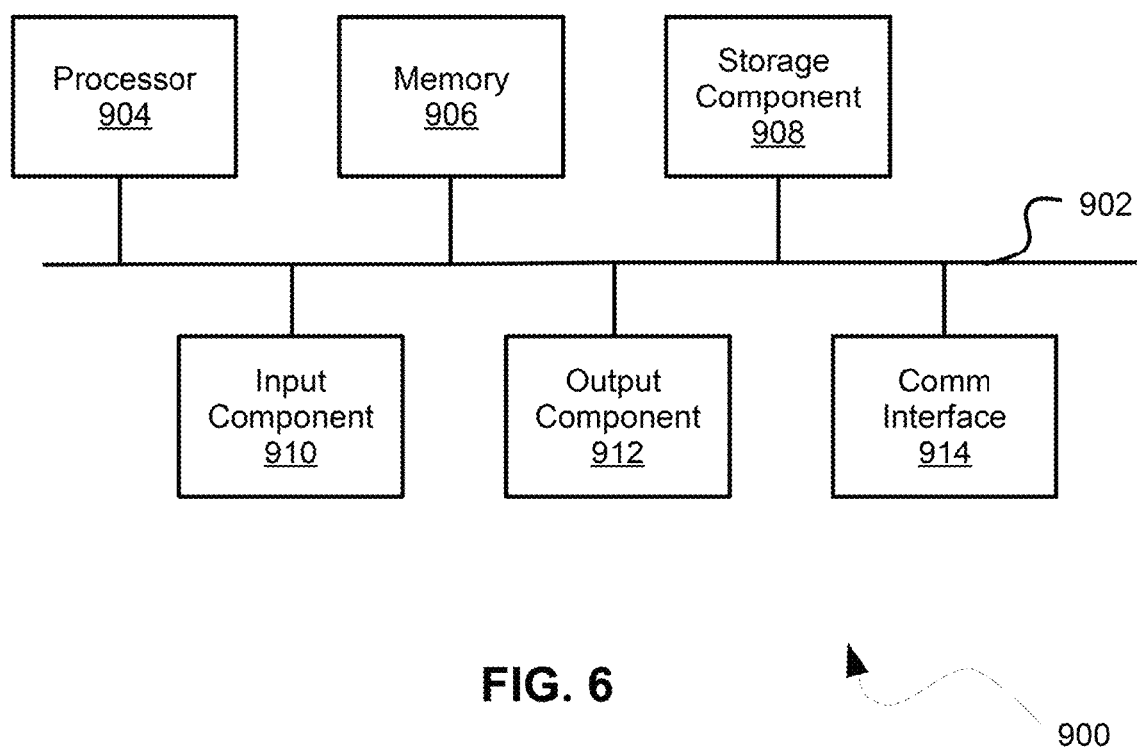
FIG. 6 illustrates example components of a computing device used in connection with non-limiting embodiments.

Referring now to FIG. 6, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 6. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for predicting product temperatures, comprising:
    inserting temperature probes into a plurality of different perishable products being stored and/or transported in at least one environment;
    arranging, in the at least one environment, at least one environmental sensor, wherein the at least one environmental sensor is not affixed to the plurality of different perishable products;
    collecting, from the temperature probes, temperature data of the plurality of different perishable products during a time period during which the plurality of different perishable products are present in the at least one environment and are swapped at least once with other products, the temperature data comprising at least one of the following: a start temperature value, a swap temperature value, an end temperature value, any temperature value collected between the start temperature value and the end temperature value, or any combination thereof, and the time period comprising at least one of the following: a pre-cool time, a total swap time, a total cycle time, any portion of time of the pre-cool time, the total swap time, or the total cycle time, or any combination thereof;

collecting, from the at least one environmental sensor, environmental data of the at least one environment during the time period;

at least one of cleaning and normalizing the temperature data of the plurality of different perishable products during the time period using at least one pre-determined filter, the at least one predetermined filter configured to ignore out-of-range values falling outside at least one of the following in-range values: the start temperature value being greater than 45° F., the swap temperature value being greater than 32° F. and less than 35° F., the end temperature value being greater than 32° F. and less than 35° F., the pre-cool time before swap exceeding 20 minutes, the total swap time being less than 21 minutes and greater than 0 minutes, the total cycle time being less than 180 minutes, or any combination thereof;

generating a machine-learning model based on the temperature data and the environmental data, the machine-learning model comprising associations between different product types and temperature changes over time in the at least one environment;

arranging at least one package of at least one perishable product in the at least one environment, wherein the at least one perishable product is not part of the plurality of different perishable products;

collecting second environmental data from the at least one environmental sensor and/or from a separate data source while the at least one package is in the at least one environment; and generating a predicted temperature of the at least one perishable product based on inputting the second environmental data into the machine-learning model.

2. The method of claim 1, wherein the predicted temperature is generated based partially on a product type of the at least one perishable product.

3. The method of claim 1, wherein the predicted temperature is generated based partially on a package type of the at least one package.

4. The method of claim 1, wherein the predicted temperature is generated based partially on a room configuration of the at least one environment.

5. The method of claim 1, wherein the at least one environment comprises at least one of the following: a forced air chamber, a vacuum tube, a vehicle cargo unit, or any combination thereof.

6. The method of claim 1, wherein the predicted temperature comprises at least one of the following: a current predicted temperature, a temperature at a future time in the at least one environment, a temperature at a future time in at least one other environment, or any combination thereof.

7. The method of claim 1, wherein the at least one environmental sensor comprises at least one of the following: a temperature sensor configured to measure a temperature in the at least one environment, a pressure sensor configured to measure pressure in the at least one environment, a vacuum tube sensor configured to measure at least one parameter of a vacuum tube, a gas sensor configured to measure at least one parameter of gas applied to the product, or any combination thereof.

8. The method of claim 1, further comprising generating at least one of the following: an optimal cooling time based on the predicted temperature, a resulting product temperature in different locations in the environment based on a range of ambient temperatures, or any combination thereof.

9. The method of claim 1, wherein the separate data source comprises a database having environmental configuration data stored therein.

10. A system for predicting product temperatures, comprising at least one processor programmed or configured to:

collect, from temperature probes inserted into a plurality of different perishable products being stored and/or transported in at least one environment, temperature data of the plurality of different perishable products during a time period during which the plurality of different perishable products are present in the at least one environment and are swapped at least once with other products, the temperature data comprising at least one of the following: a start temperature value, a swap temperature value, an end temperature value, any temperature value collected between the start temperature value and the end temperature value, or any combination thereof, and the time period comprising at least one of the following: a pre-cool time, a total swap time, a total cycle time, any portion of time of the pre-cool time, the total swap time, or the total cycle time, or any combination thereof;

collect, from at least one environmental sensor arranged in the at least one environment, environmental data of the at least one environment during the time period, wherein the at least one environmental sensor is not affixed to the different perishable products;

at least one of clean and normalize the temperature data of the plurality of different perishable products during the time period using at least one pre-determined filter, the at least one predetermined filter configured to ignore out-of-range values falling outside at least one of the following in-range values: the start temperature value being greater than 45° F., the swap temperature value being greater than 32° F. and less than 35° F., the end temperature value being greater than 32° F. and less than 35° F., the pre-cool time before swap exceeding 20 minutes, the total swap time being less than 21 minutes and greater than 0 minutes, the total cycle time being less than 180 minutes, or any combination thereof;

generate a machine-learning model based on the temperature data and the environmental data, the machine-learning model comprising associations between different product types and temperature changes over time in the at least one environment;

collect second environmental data from the at least one environmental sensor and/or from a separate data source while at least one package of at least one perishable product is in the at least one environment, wherein the at least one perishable product is not part of the plurality of different perishable products; and generate a predicted temperature of the at least one perishable product based on inputting the second environmental data into the machine-learning model.

11. The system of claim 10, wherein the predicted temperature is generated based partially on a product type of the at least one perishable product.

12. The system of claim 10, wherein the predicted temperature is generated based partially on a package type of the at least one package.

13. The system of claim 10, wherein the predicted temperature is generated based partially on a room configuration of the at least one environment.

14. The system of claim 10, wherein the at least one environment comprises at least one of the following: a forced air chamber, a vacuum tube, a vehicle cargo unit, or any combination thereof.

15. The system of claim 10, wherein the predicted temperature comprises at least one of the following: a current predicted temperature, a temperature at a future time in the at least one environment, a temperature at a future time in at least one other environment, or any combination thereof.

16. The system of claim 10, wherein the at least one environmental sensor comprises at least one of the following: a temperature sensor configured to measure a temperature in the at least one environment, a pressure sensor configured to measure pressure in the at least one environment, a vacuum tube sensor configured to measure at least one parameter of a vacuum tube, or any combination thereof.

17. The system of claim 10, wherein the at least one processor is further programmed or configured to generate at least one of the following: an optimal cooling time based on the predicted temperature, a resulting product temperature in different locations in the environment based on a range of ambient temperatures, or any combination thereof.

18. The system of claim 10, wherein the separate data source comprises a database having environmental configuration data stored therein.

19. A computer program product for predicting product temperatures, comprising at least one non-transitory computer readable medium including program instructions that, when executed by at least one processor, cause the at least one processor to:
  collect, from temperature probes inserted into a plurality of different perishable products being stored and/or transported in at least one environment, temperature data of the plurality of different perishable products during a time period during which the plurality of different perishable products are present in the at least one environment and are swapped at least once with other products, the temperature data comprising at least one of the following: a start temperature value, a swap temperature value, an end temperature value, any temperature value collected between the start temperature value and the end temperature value, or any combination thereof, and the time period comprising at least one of the following: a pre-cool time, a total swap time, a total cycle time, any portion of time of the pre-cool time, the total swap time, or the total cycle time, or any combination thereof;
  collect, from at least one environmental sensor arranged in the at least one environment, environmental data of the at least one environment during the time period, wherein the at least one environmental sensor is not affixed to the different perishable products;
  at least one of clean and normalize the temperature data of the plurality of different perishable products during the time period using at least one pre-determined filter, the at least one predetermined filter configured to ignore out-of-range values falling outside at least one of the following in-range values: the start temperature value being greater than 45° F., the swap temperature value being greater than 32° F. and less than 35° F., the end temperature value being greater than 32° F. and less than 35° F., the pre-cool time before swap exceeding 20 minutes, the total swap time being less than 21 minutes and greater than 0 minutes, the total cycle time being less than 180 minutes, or any combination thereof;
  generate a machine-learning model based on the temperature data and the environmental data, the machine-learning model comprising associations between different product types and temperature changes over time in the at least one environment;
  collect second environmental data from the at least one environmental sensor and/or from a separate data source while at least one package of at least one perishable product is in the at least one environment, wherein the at least one perishable product is not part of the plurality of different perishable products; and
  generate a predicted temperature of the at least one perishable product based on inputting the second environmental data into the machine-learning model.

* * * * *